United States Patent [19]

Maier

[11] Patent Number: 5,092,437

[45] Date of Patent: Mar. 3, 1992

[54] SHAFT LOCKING APPARATUS

[75] Inventor: Willy Maier, Kloten, Switzerland

[73] Assignee: Daverio AG, Zurich, Switzerland

[21] Appl. No.: 676,843

[22] Filed: Mar. 28, 1991

[30] Foreign Application Priority Data

Apr. 11, 1990 [CH] Switzerland .................. 1240/90

[51] Int. Cl.[5] .............................................. F16D 67/00
[52] U.S. Cl. .................................... 192/8 R; 192/7
[58] Field of Search .............. 192/7, 8 R; 188/82.74, 188/82.3, 82.4, 82.34

[56] References Cited

U.S. PATENT DOCUMENTS

| 2,066,167 | 12/1936 | Swartz | 192/8 R |
| 3,366,752 | 1/1968 | Smulka | 192/8 R |

*Primary Examiner*—Richard Lorence
*Assistant Examiner*—Andrea Pitts
*Attorney, Agent, or Firm*—Weiser & Stapler

[57] ABSTRACT

A locking apparatus which includes a locking element, an unlocking element, and a latching member. In the rest position, two arms of the latching member are maintained in their latched positions by compressed springs. To unlock, the unlocking element is turned in one or the other direction of rotation, whereby one of two inclined surfaces lifts one arm against the restoring force of a spring via a bearing surface of the unlocking element. Upon further turning of the unlocking element, an entraining projection from this element pulls the locking element along with it in the same direction of rotation. If the unlocking element is turned in the opposite direction, the arms automatically return to a rest position.

6 Claims, 2 Drawing Sheets

SHAFT LOCKING APPARATUS

BACKGROUND OF THE INVENTION

The present invention generally relates to a tilting device for the carriages of a package distribution conveyor, and more particularly, to a locking apparatus for such a tilting device.

A locking apparatus of this general type is known from German Patent (DE-PS) 30 50 102, assigned to the assignee of the present invention. This apparatus is used to maintain each tray of a package distribution conveyor in a horizontal rest position until it is deflected into a tilted position. This apparatus requires a relatively large drive plate which has arresting projections that cooperate with a central stop in the form of a notch and secure the drive plate in its rest position until it is disengaged. In practice it has further been found that such a distribution conveyor requires an additional braking device.

From German Patent Publication (DE-A) 36 02 861 there is also known a locking arrangement for a package distribution conveyor which generally corresponds to the previously known distribution conveyor. This apparatus is detailed in that printed publication with reference to FIGS. 3 and 4 in column 9, line 50 through column 10, line 22. There, only diagrammatically represented locking means are disclosed, which lock the tray against a bearing member to prevent rotation. Further details concerning the locking means cannot be ascertained from this printed publication.

SUMMARY OF THE INVENTION

The present invention has the object of providing an apparatus of the above-mentioned type which requires less space, has fewer component parts, and nevertheless operates reliably and provides precise and secure locking. This and other objects which will appear, are achieved by providing a locking apparatus which is essentially comprised of only three components: a locking element, an unlocking element, and a latching member. These components can be manufactured very easily and made very strong, and can be attached to the shaft using little space.

In a preferred embodiment of the invention, the unlocking element has inclined surfaces which deflect the latching member in response to limited rotation of the unlocking element. Through this deflection of the latching member, it becomes disengaged from the locking element. It has been found that a rotation of only about three degrees suffices to move the latching member out of engagement.

According to a further development of the invention, the latching member is deflected against the restoring force of a spring. If the load is again brought into the rest position through rotation of the shaft, the spring automatically moves the latching member back into the locked position. Further desirable advantages will appear from the description which follows.

An illustrative embodiment of the invention is further described with reference to the accompanying drawings.

DETAILED DESCRIPTION OF THE PREFERRED EMBODIMENT

Figure 1:
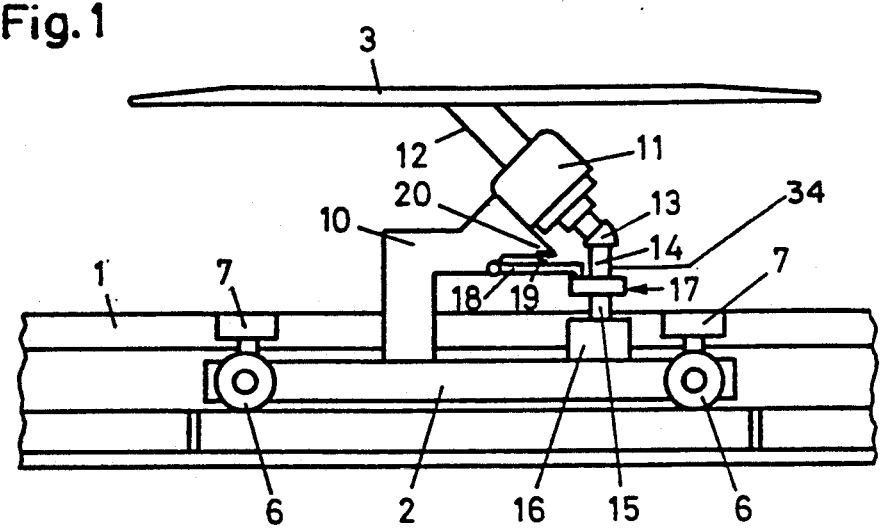
FIG. 1 is a side view of one carriage of a distribution conveyor with chain drive.

FIG. 1 shows the construction of one carriage 2 of a package distribution conveyor, known in itself. The carriage 2 has four travelling rollers 6 by means of which it progresses on a track 1. Two guide rollers 7 provide the horizontal guidance, while the drive for the carriage 2 is provided in known manner by an endless circulating chain. The support frame 10 has a bearing 11 for a tilted axle 12 to which a tray 3 is attached. The axle 12 is connected to a drive 16 by means of a universal joint 13 and a vertical shaft 34. By means of this drive 16, the shaft 34 can be rotated at a discharge location in one or the other direction, whereupon the tray 3 performs a turn-and-tilt movement to one side or the other of track 1, causing a package (not shown here) to slide off into a receptacle.

By means of locking apparatus 17, the tray 3 is held securely in the illustrated rest position until reaching the discharge station. At the discharge station, the locking apparatus 17 is unlocked and the tray 3 discharged by a rotational movement of shaft 34. Following the discharge process, an opposite rotational movement of shaft 34 swings the tray 3 back into the horizontal position and automatically locks it by means of apparatus 17.

The locking apparatus, which is illustrated in more detail in FIGS. 2 to 6, includes locking element 14, unlocking element 15, as well as latching member 33. Shaft 34 is formed by the two above-mentioned elements 14 and 15. Latching member 33 has two arms 18 which are pivotable independently of each other about an axle 28 which is horizontal and rigidly connected to frame 10. Between each arm 18 and a projection 20 from the frame, a coil spring 19 is attached which urges the free end 30 (FIGS. 3 and 6) of the respective arm 18 downwardly against locking plate, or disc 31 (FIG. 4) of locking element 14. This locking disc 31 is engaged in recess 22 (FIG. 5) of unlocking plate, or disc 32 (also FIG. 5) of the unlocking element 15. Two projections 21 from locking disc 31, which extend radially outward and are spaced from each other, flank entraining projection 24 extending from unlocking disc 32 in such a manner that, in the locked condition illustrated in FIG. 2, the unlocking element 15 can be rotated in one or the other direction of rotation through an angle α or −α, without thereby causing accompanying rotation of the locking element 14. Upon rotation beyond the above-mentioned angles, the locking element 14 is entrained in rotation and the tray 3 is deflected in the manner previously described.

Figure 2:
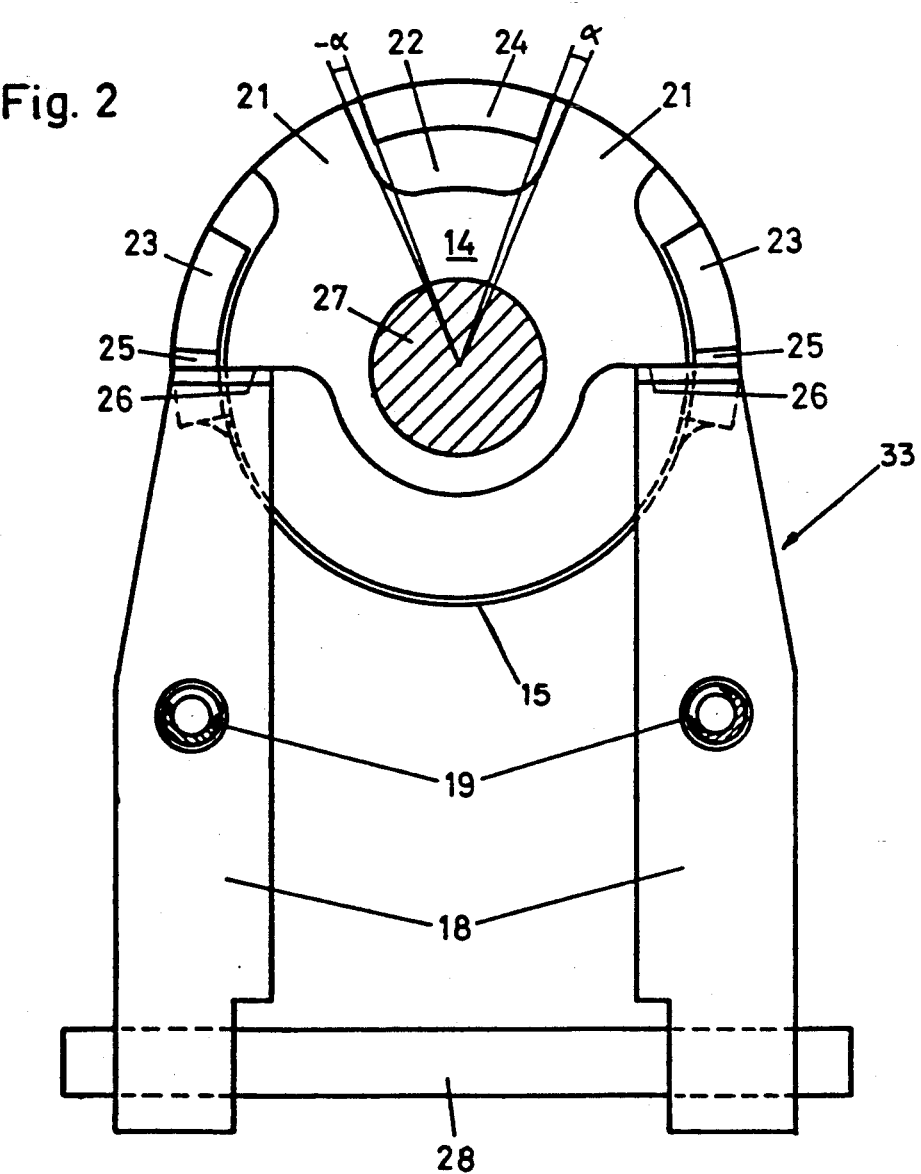
FIG. 2 is a top view of the locking apparatus.
Figure 3:
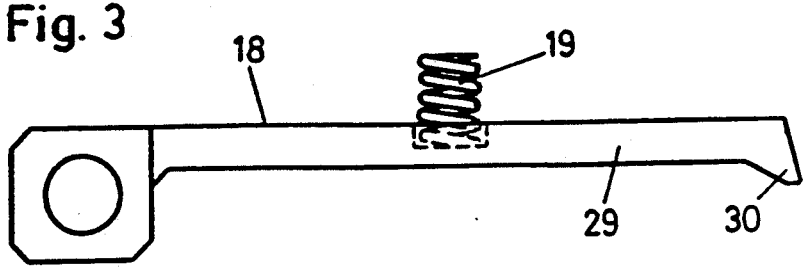
FIG. 3 is a side view of a latching member.
Figure 4:
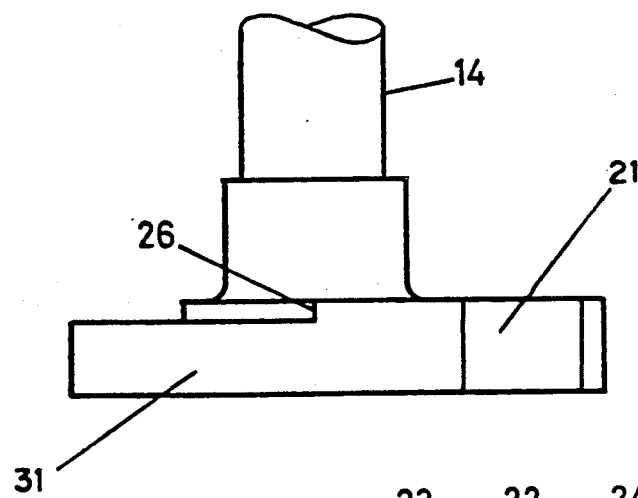
FIG. 4 is a side view of a locking element.
Figure 5:
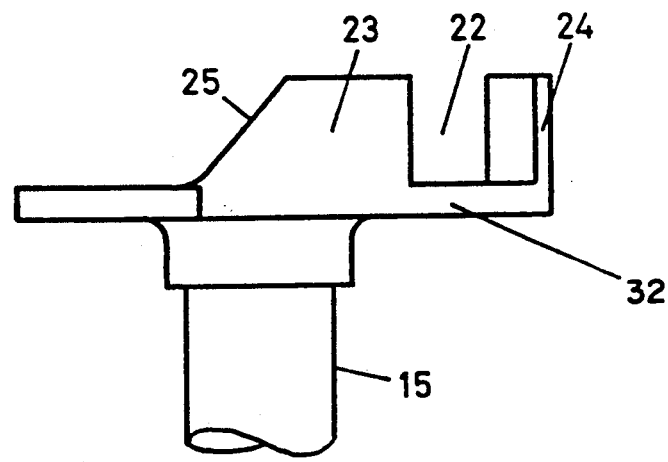
FIG. 5 is a side view of an unlocking element.
Figure 6:
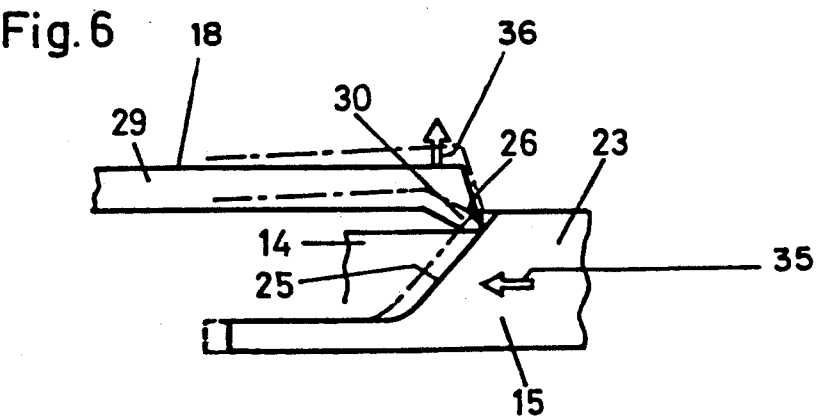
FIG. 6 is a partial view of the locking apparatus.

If unlocking element 15 is turned in a clockwise direction relative to the illustration of FIG. 2, then, even before the angle o in FIG. 2 is exceeded, the right-hand one of the two arms 18 is raised at its free end 30 and thereby lifted above abutting shoulder 26 of locking element 14. This pivoting movement of the above-mentioned arm 18 is produced by inclined surface 25 of a projection 23 from unlocking disc 32. FIG. 6 illustrates this unlocking process. In this figure the locked position is shown in solid lines. In that position, arms 18 rest with the forward end upon locking element 14 and abut at their respective forward ends against shoulders 26 on locking element 14. If the unlocking element 15 is displaced in the direction of arrow 35 into the position shown in phantom, then arm 18 is forced by the inclined surface 25 of unlocking element 15, in the direction of arrow 36, upwardly into the displaced position shown in phantom. In this position, the forward end 30 of arm 18 is slightly above shoulder 26, so that the unlocking element 15 can be turned further in the direction of arrow 35. Upon exceeding the angle a, locking element 14 is also entrained in this rotational direction by entraining projection 24. The other of the two arms 18 (in FIG. 2 the left-hand arm) moves away from its position abutting shoulder 26 in a circumferential direction but without being pivoted. If the unlocking element 15 is turned in the opposite direction, then correspondingly the left-hand one of the two arms 18 in FIG. 2 is pivoted, while the right-hand arm moves away from its abutting shoulder 26 in the circumferential direction but without pivoting.

If tray 3 is to be swung back into the horizontal position and locked, unlocking element 15 is turned in the opposite rotational direction until locking element 14 reaches the position shown in FIG. 2, in which the previously pivoted arm is swung downwardly into the locked position by a compressed spring 19. As is apparent, through cooperation between one arm 18 with the corresponding surface 25, the unlocking element 15 is also brought into the symmetrical position illustrated in FIG. 2 In that position the tray 3 is then locked in its horizontal position and can be swung to the left or to the right at the next discharge station in the manner described.

The locking apparatus embodying the invention is particularly suitable for the carriage of a distribution conveyor for individual items, such as packages. There, the tray 3 can also execute a simple tilting movement about a horizontally extending shaft. In that case, shaft 34 can also extend horizontally. However, the invention is not limited to such application.

It will therefore be understood that various changes in the details, materials and arrangement of parts which have been herein described and illustrated in order to explain the nature of this invention may be made by those skilled in the art within the principle and scope of the invention as expressed in the following claims.

I claim:

1. Locking apparatus coupling a rotatable shaft to a support means, wherein the rotatable shaft is further coupled to a drive means, wherein said locking apparatus releasably secures said shaft against rotation caused by a load in either direction relative to said support means, and characterized in that
   said shaft has a locking means coupled to said load and unlocking means coupled to said drive means,
   said unlocking means in a rest position is able to perform limited rotation in opposite directions relative to the locking means, and
   a latching means coupled to the support means, wherein the unlocking means displaces said latching means away from the locking means during said limited rotation, thereby releasing the shaft from said support means.

2. Apparatus according to claim 1, further characterized in that
   the unlocking means has inclined surfaces which deflect the latching means in response to said limited rotation of the unlocking means and disengage it from the locking means.

3. Apparatus according to claim 2, further characterized in that
   the latching means has two pivotable arms, which cooperate with respective ones of said inclined surfaces and respectively lock said shaft against rotation in one or the other direction.

4. Apparatus according to claim 3, further characterized in that
   each arm has a free end which, in the rest position, abuts against a shoulder of the locking means, thereby locking said shaft against rotation.

5. Apparatus according to claim 1, further characterized in that
   during unlocking the latching means is displaced against a force of at least one spring.

6. Apparatus according to claim 1, further characterized in that
   the locking means and the unlocking means are provided respectively with a locking disc and an unlocking disc, each extending radially with respect to a longitudinal dimension of the shaft, and
   an entraining projection from one disc is engaged in a recess in the other disc in such manner that, in the rest position, the unlocking means is rotatable in both directions through an angle $a$, $-a$ before the entraining projection contacts an end of the recess.

* * * * *